United States Patent [19]

Schatz

[11] Patent Number: 4,630,444
[45] Date of Patent: Dec. 23, 1986

[54] INTERNAL COMBUSTION ENGINE WITH A COMBINATION EXHAUST AND DIRECT DRIVE SUPERCHARGER

[76] Inventor: Oskar Schatz, Tellhohe 14, D-8031 Stockdorf, Fed. Rep. of Germany

[21] Appl. No.: 609,957

[22] Filed: May 14, 1984

[30] Foreign Application Priority Data

May 18, 1983 [DE] Fed. Rep. of Germany ....... 3318093
May 18, 1983 [DE] Fed. Rep. of Germany ....... 3318162

[51] Int. Cl.⁴ .............................................. F02B 37/10
[52] U.S. Cl. ........................................ 60/598; 60/620; 60/605; 123/560
[58] Field of Search ................. 60/620, 621, 622, 623, 60/598, 605; 123/559, 560

[56] References Cited

U.S. PATENT DOCUMENTS 1,296,555  3/1919  Ricardo .............................. 60/622
1,350,570  8/1920  Sarjent ............................... 60/613
1,904,070  4/1933  Morgan .............................. 60/620

FOREIGN PATENT DOCUMENTS 412830   7/1934  United Kingdom .
815494   6/1959  United Kingdom .
1024846  4/1966  United Kingdom .

Primary Examiner—Michael Koczo
Attorney, Agent, or Firm—Harness, Dickey & Pierce

[57] ABSTRACT

An internal combustion engine is connected to a supercharger operated by exhaust energy for the compression and transport of an air charge. The supercharger has at least one exhaust chamber and one air chamber which are separated from each other by a partition. The exhaust chamber is equipped with an exhaust inlet and an exhaust outlet, and the air charge chamber with an air charge inlet and an air charge outlet. In the gas circuit connected to the exhaust inlet is a system for the timed introduction of exhaust into the exhaust chamber. The supercharger is also powered by a linkage responsive to rotation of the engine crankshaft. The linkage permits changing the phase relationship between the partition and the engine crankshaft.

4 Claims, 3 Drawing Figures

INTERNAL COMBUSTION ENGINE WITH A COMBINATION EXHAUST AND DIRECT DRIVE SUPERCHARGER

BACKGROUND AND SUMMARY OF THE INVENTION

The invention concerns an Internal Combustion Engine with a supercharger operated by means of exhaust energy for the compression and transport of an air charge. The supercharger has at least one exhaust chamber and one air charge chamber which are separated from each other by a partition. The exhaust chamber is equipped with an exhaust inlet and an exhaust outlet, and the air charge chamber with an air charge inlet and an air charge outlet. In the gas circuit connected to the exhaust inlet is a system for the timed introduction of exhaust into the exhaust chamber. The supercharger according to this invention is also powered by a linkage responsive to rotation of the engine crankshaft. A theoretically known internal combustion engine of this type is especially intended for internal combustion motors for power vehicles.

Today, customary with the charging of Diesel motors, for which almost exclusively exhaust driven superchargers are used, three areas of operation are observed.

(1) Area of lower speed of rotation, whereby the exhaust driven supercharger transports too little air;

(2) A median speed of rotation area, in which air requirement and air available are both more or less even;

(3) Area of high speed of rotation, in which air supplied by the exhaust driven supercharger is too high and therefore air or exhaust is blown off.

Besides, there is the problem that with sudden load increase, the exhaust supercharger needs several seconds—up to 7 or 8 seconds for car motors—in order to build up the necessary load pressure. Also, exhaust driven superchargers usually have a lower compression ratio than normally aspirated motors in order to provide the same compression pressure and temperatures at loading. Starting of Diesel engines with exhaust driven superchargers is different, because the compression pressures in low-power conditions are low and the necessary ignition temperature is difficult to achieve. Therefore, starting assistance for these motors is necessary.

It is further known, that especially with car and stationary motors that a high degree of energy is lost in the exhausts. The recovery of workable energy from the exhaust of small combustion power machines, especially cars has up to now not been done due to reasons of cost. If one uses mechanical direct driven superchargers for Diesel motors, then at low speeds of rotation, the necessary air supply is provided, but at median and higher speeds of rotation the supply of air is too high. Altogether there is the disadvantage that the power for the start of the supercharger must be taken from the power output of the internal combustion engine. Relief is created here in such a way that either the mechanical supercharger at median or higher speeds of rotation is switched off through coupling, or a gear unit for the alteration of the transmission gear is introduced.

With Otto cycle (gasoline) motors, the situation is similar, only that the starting difficulties with the exhaust supercharged motors are not present.

In summary it is determined, that for the supercharging of combustion motors the presentation of exhaust energy at low speeds of rotation is too low and at high speeds of rotation is too high. If one wants to use instead of an exhaust driven supercharger a mechanical driven one, which delivers at low speeds of rotation the needed supercharging energy, then one has to use mechanical output energy for this. The increase of performance through recovery of workable energy out of the exhaust energy is now too expensive, especially for smaller motor vehicles.

It has therefore theoretically been recommended to create an internal combustion engine of the aforementioned type, in which the power transfer can become effective between the piston of a supercharger and the mechanical output of the internal combustion engine in both directions, so that from under a particular load level mechanical energy can be transferred from an output shaft of the internal combustion engine to the supercharger and from this to the air charge, and at high engine power levels energy is taken from the exhaust gases and transferred to the output shaft of the internal combustion engine. With this process, one can in a cost advantageous way, with a single appliance, take energy from the output shaft of the internal combustion engine, as well as out of the exhaust of this internal combustion engine, to effect the supercharging of the internal combustion engine, and also transfer the exhaust energy to the output shaft.

A positive displacement supercharger which should be drivable mechanically as well as being drivable by exhaust gas energy transfers energy from the expansion of the exhaust gas onto the output shaft of the internal combustion engine causing various air regulation problems.

The regulation of the air amount supplied to the engine can be reached with mechanical as well as with exhaust driving of the supercharger through adjustment of the supercharger piston stroke. In exhaust driven operation the natural exhaust impulses control the cycle frequency of the supercharger adapts to the ignition frequency of the motor. If a pulse generator installation is used, over which exhaust impulses out of storage are passed to the supercharger, the time frequency of the pulse generator can be altered. By mechanical operation there is however the possibility also to alter the start speed of the supercharger.

If the supercharger is operated as an exhaust gas driven motor, an effective usage of the exhaust energy can only be obtained, when the exhaust impulses timely coincide with the output shaft of the motor specified simultaneous movement of the supercharger piston, as otherwise the exhaust energy would have an effect to act as a brake, that is to say energy consuming.

Installations for speed regulation or stroke adjustment for the mechanical supercharger output are complicated and expensive especially for the application of the explained process for small power vehicle motors.

The invention is based on the concern to create a simple and cost advantageous and at the same time reliable construction, which enables the adaption of the mechanical supercharger movement to the timing of exhaust impulses, and which allows also, to carry out for the mechanical supercharger operation an especially simple and effective regulation of the air charge amount.

The solution of the task is such that the power transfer installation shows a device for the alteration of the phase position between start and output side.

In this way the movement of the supercharger piston and the output shaft of the motor can be coordinated, so that through the energy from the exhausts in the exhaust chamber released energy supports the movement of the piston and in this way is carried over onto the output shaft of the internal combustion engine.

As has been proved theoretically by usage of a mechanical displacement supercharger the slightest amount of energy is required, if the air from the supercharger flows directly into the motor cylinder. Through the alteration of the phase position between the driving and driven gears of the supercharger gears train the synchronization between the engine and supercharger can be altered. The invention enables therefore with comparatively simple and cost advantageous construction not only the optimal adjusting of supercharging movement on the exhaust impulses in the exhaust driven operation, but also the otherwise only expensively to be solved air amount regulation in mechanical supercharger operation, whereby the initially explained, up to now only theoretically mentioned operation type is also practically feasible, namely especially also for small power vehicle motors, where this has special meaning.

An advantageous development consists, that the power carry-over installation can be interrupted what for instance can be done through coupling.

An especially advantageous development consists, in that the power carry-over installation includes a belt drive, in which the proportion of the belt length between driving and loose belt strand is adjustable.

The installation for the timed charging and exhaust chamber can be the exhaust valve or else the exhaust valves of the internal combustion engine. One can however install a pulse generator valve, whereby this pulse generator valve can have an exhaust collector or buffer interposed.

For a supercharger operation type with especially minimal expenditure of energy exists an advantageous development in such a way that the air transport volume of an air charge chamber of the supercharger corresponds to the desired air charge amount of the engine cylinders.

On hand of the new following description of an in the drawing presented performance example of the invention this is explained more closely. It shows:

DETAILED DESCRIPTION OF THE INVENTION

Figure 1:
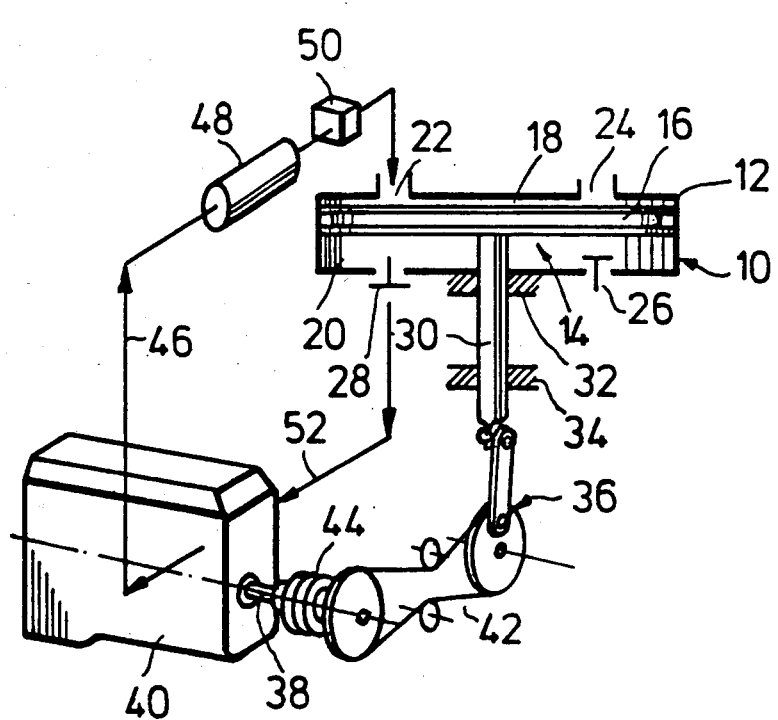
FIG. 1: Schematic in connection with cross section through a supercharger-motor the arrangement of this supercharger-motor unto an internal combustion engine.

Supercharger-motor 10 consists of a housing 12, which encloses a charging chamber 14, in which a back and forth movable separation wall 16 is arranged in the shape of a flat piston, which subdivides the inner room of the charging chamber 14 in an exhaust chamber 18 and an air charge chamber 20. The exhaust chamber 18 is equipped with an air charge inlet 26 and an air charge outlet 28. The separation wall 16 is tightly connected with a shaft 30, which is guided outside of the charging chamber 14 in two guides 32 and 34 for axial movement. The shaft 30 is connected to a crank gear 36, which is driven by output shaft 38 of the internal combustion engine 40. Chain drive 100 is provided for the alteration of the phase position between coupling 44 and separation wall 16. The drive connection comprises elements 36, 100, 44 and is so designed, that it is also suitable to transmit drive energy in the opposite direction, in other words from the separation wall 16 to the output shaft 38.

The exhaust inlet 22 is connected to the exhaust side of the internal combustion engine 40 as indicated by FIG. 1 by exhaust system 46, which supplies gas either directly from the exhaust outlet valves of the cylinder of the internal combustion engine 40 or through an exhaust collector or buffer 48 and a pulse generator valve 50. Exhaust impulses, are used to move the separation wall 16 in the direction of the air charge chamber 20, to thereby push out air in the air charge chamber 20 and face it to the air charge outlet 28 in the direction of the air charge system 52 of the internal combustion engine 40, and push the air into the cylinder of the internal combustion engine with an open inlet valve. The air charge system 52 can also be closed against the air charge chamber 20 through a non return flap, when the inlet valve on the internal combustion engine 40 does not lie in tolerable vicinity, in order to hold the damage of the compressor area of the loader relaxer 10 to a minimum. Depending on the operational facts, the number and the arrangement of the cylinders of the internal combustion engine, the space arrangement of the supercharger-motor 10 or if need be also several supercharger-motor etc. Modifications in the exhaust and air charge system can be advantageous or necessary, which in connection with the basic thoughts of the invention do not need to be mentioned in detail. Two operation types however should be mentioned here very briefly, which enable an especially minimal expenditure of energy.

In one form of the invention air flows into the cylinder to be charged with atmospheric pressure from the beginning of the air intake stroke. The pressure increases in the cylinder until the desired end pressure is achieved. The increase is accomplished by the supercharger-motor 10 which enables atmospheric air to enter the inlet and slowly increase the air pressure until the desired end pressure is achieved. For this operation type the supercharger-motor 10 is so dimensional that the air transport volume corresponds to the desired air charge amount.

After a second variant the additional air is sucked in air in the cylinder of the internal combustion engine needed air during the piston movement of the motor cylinder in the area of the lower dead center in the cylinder.

For this operation type the air transport volume of the relaxer-loader 10 corresponds to the to be loaded motor cylinder additionally to a from the motor piston sucked in air amount for its compression on the load pressure desired air amount.

After the compression lift of the separation wall 16 this is being moved back through the built up counter pressure and the exhaust is being pushed out through the exhaust outlet 24 into the exhaust system of the internal combustion engine 40.

The gear train 100 in form of a belt drive embraces the belt 110, preferably a toothed strap type, which is led over in all four pulleys, including a drive gear 114, an output gear 112, and between these two in direction of the belt run a diagonally to the belt run movable pulley 120, as well as between drive roll 114 and output roll 112 a diagonally to the belt run adjustable pulley 122. The pulley 120 lies therefore on the returning strand 116 and the roll 122 on the driving strand 118 of the belt 110. This arrangement is therefore suitable, because the pulley 120 is being pressed through a spring 124 against the belt 110, in order to keep up the desired belt tension. Through the possibility that the pulley 120 moves slightly diagonally to the direction of tape run, without that this has been caused by an adjustment of the pulley 122, would enable the arrangement of the pulley 120 in the area of the starting strands minimal length alterations of the driving strand in an uncontrollable way, and thereby a disturbance of the absolute independent time control of the driving pulley 112 and drive gear 114.

The pulley 122 on the other hand in its position diagonally to the run of direction of the band 110 is exactly adjustable. At the example shown the pulley 122 is positioned on a piston rod 126, which is connected with a cylinder 128 movably arranged by piston 130, which is loaded bilaterally hydraulic, that is to say, we are dealing with cylinder 128 with the piston 130 with a double effective hydraulic cylinder, through which the position of the pulley 122 is exactly adjustable. The hydraulic operation enables a simple regulation of the phase position of the belt drive in dependency of externally determined parameters, as for instance the operation data of the power vehicles and their combustion motors.

Figure 2:
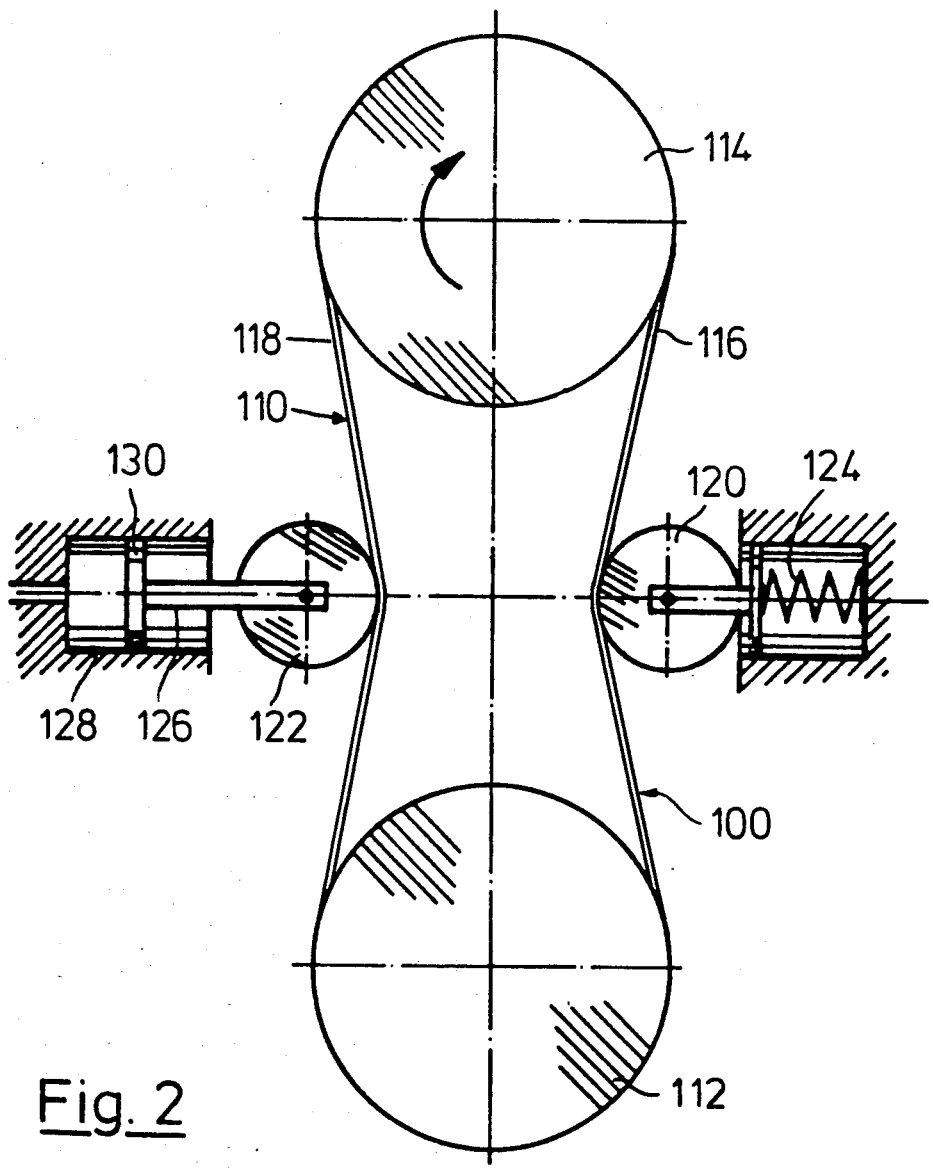
FIG. 2: A schematic side view of a first variant of a for the arrangement according to FIG. 3 suitable belt drive.

If the pulley 122 in FIG. 2 is moved to the right, then the driving strand 118 lengthens itself, while the returning strand 116 gets correspondingly shortened. The output gear 112 therefore is moved rotationally ahead of the drive gear 114. If one moves the pulley 122 in the opposite direction, the driving strand 118 comes to its shortest, stretched position, which causes a rotational lagging of the drive gear 114 as compared with the output gear 112, whereas a phase shift of ZERO should be provided for in the middle between these two positions of the pulley 112.

The arrangement in both performance examples is made in such a way, that in the end position of the adjustable pulley 122 one strand 116 or 118 is straightened and the other strand shows its greatest deflection out of the straightened position. Variations in the arrangement of the pulleys 120 and 122 are possible. For instance the pulleys 120 and 122 shown in FIG. 2 could be arranged on the other belt side. With the arrangement according to FIG. 2 the spring 124 must even out the position movement of the pulley 122. With the performance form according to FIG. 3 this is not necessary, there a smaller, harder spring can be used.

Figure 3:
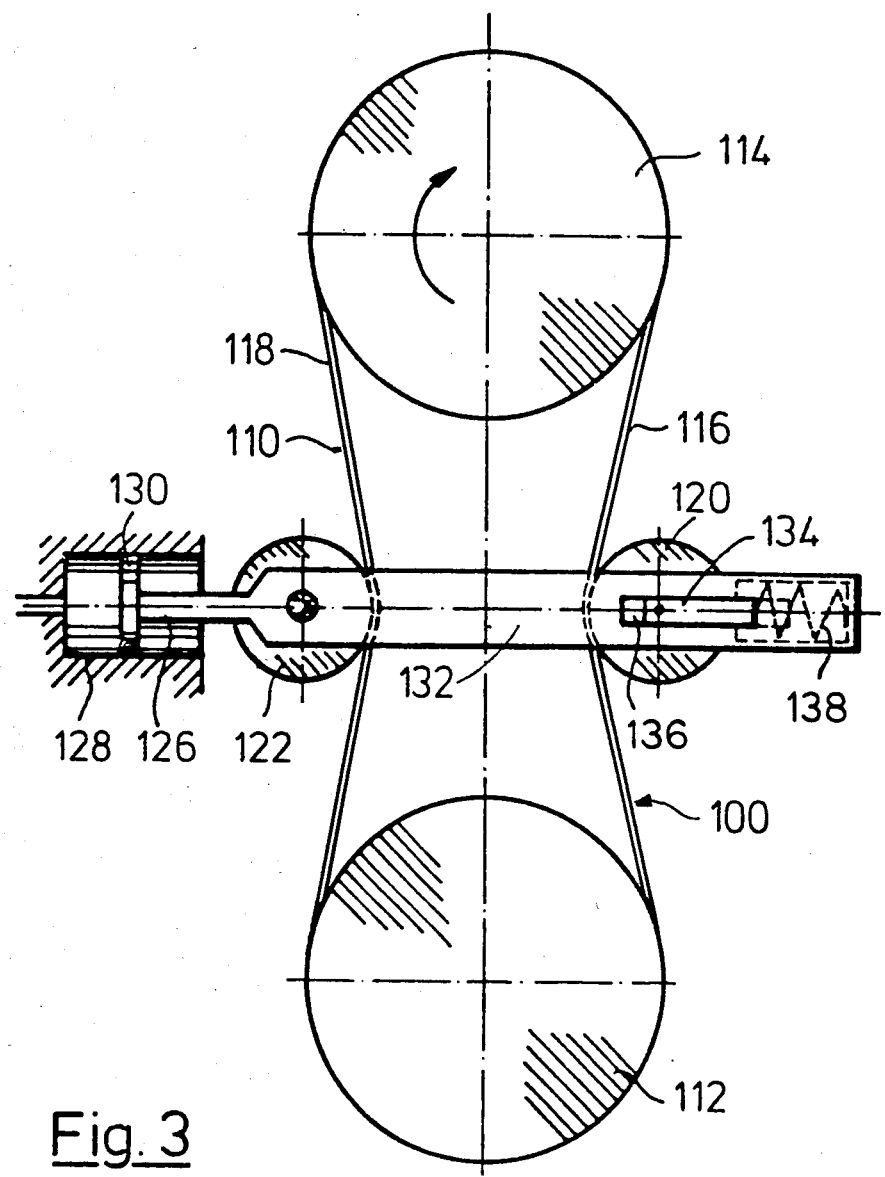
FIG. 3: A schematic side view of a second variant of such a belt drive.

With the arrangement form according to FIG. 3 there is a piston rod 126 connected with a bearing element 132, in which the pulley 122 is tightly positioned. The pulley 120 is positioned by a pusher 134, which is limited for movement in the bearing element 132 diagonally to the direction of run of the belt 110, whereby selector shaft guides 136 serve for the reception of the pusher 134. The pusher 134 is supported on the bearing element 132 by a spring 138. This spring keeps the belt 110 under the desired tension.

If the piston 130 is moved, the pulleys 120 and 122 are also moved. As both pulleys 120 and 122 are positioned on the same area of the belt 110, the change in length of such strand is about the same. Minimal deviations, which appear with the leaving of a symmetric position of both strands 116 and 118, can be smoothed out by the spring 138.

The effect would be the same, if both pulleys 120 and 122 of FIG. 3 were arranged on the opposite band side, as has been explained at the end of the description of FIG. 2. It is shown, however, that the belt drive with phase displacement can be realized in very different ways and is not limited to the mentioned examples.

In order to adjust the belt tension, the strength of the spring 124 or else 138 should preferably be adjustable as this is known with belt drives. Instead of the mechanism shown in the drawing and previously described, other installations can be used for the power transmission, as long as they are capable of providing a phase displacement between drive and output.

If an internal combustion engine 40 is operated, with supercharger-motor 10 then from the start the internal combustion engine is being supplied with a proportional air charge amount, whereby the induction pressure positions itself almost independently from the rotation number. At the start of the internal combustion engine and with low rotation speed the supercharger-motor 10 acts as a mechanical supercharger. Present exhaust energy can become effectively supportive. In the median area of number of revolutions of the internal combustion engine, the exhaust energy increases to a level high enough, that it is sufficient to compress air. If one would in this operation situation uncouple the supercharger-motor 10 from the output shaft 38 of the internal combustion engine 40, the supercharger-motor would continue to run like an exhaust gas driving supercharger, that is to say, the pressure impulses of the exhaust would produce reciprocating motion of the piston or else the separation wall 16, and thereby effect the charging of the internal combustion engine 40.

With a higher number of rotational speed the exhaust energy exceeds the energy needed for the compression of the necessary air charge amount. This energy is now carried over from the supercharger-motor 10 across the crank gear 36 to the output shaft 38 of the internal combustion engine 40. Thereby the net performance of the motor increases. Through corresponding adjustment of the gear train 100 it is assured that the exhaust impulses strike the separation wall 16 are properly synchronized.

If in certain operation situations the wish for loading is not present, which especially can be done with Otto cycle motors, then the compressor function can be switched off, for instance through the keeping open of a compressor valve, the compressor side of the supercharger-motor 10 can also be made pressure—and effectless and the supercharger-motor can be used only as a motor, that is to say for recovery of work out of the exhaust energy.

The supercharger-motor 10 can also perform the operation characteristics of a mechanical supercharger, an exhaust gas driven supercharger loader and an exhaust gas driven motor, and perform these functions continuously from one extreme to the other. Presumed is however, that the exhaust feeding follows pulsating in such a way, that at down lift of the supercharger-motor the exhaust pressure in the exhaust chamber 18 is higher than the up lift. This is safeguarded in such a way, that the natural pressure surge at the opening of the output valve of a cylinder in the internal combustion engine 40, enter at the right moment, namely at the beginning of the down lift of the supercharger-motor 10 into the exhaust chamber 18, or that the already briefly described fixed-cycle control is done through the pulse generator.

What is claimed:

1. A combination supercharger and exhaust driven motor for an internal combustion engine comprising:
    a housing defining a chamber,
    a piston disposed in said chamber for movement therein and separating said chamber into an exhaust gas chamber and an air charging chamber,
    first conduit means for connecting said exhaust gas chamber with the exhaust port of a cylinder of said engine, whereby exhaust gas pulses urge said piston toward said air charging chamber,
    second conduit means for connecting said air charging chamber with the intake port of a cylinder of said engine, whereby air in said air charging chamber compressed by said piston is directed to said cylinder,
    a drive train causing reciprocation of said piston in a predetermined phase relationship with the rotation of the crankshaft of said engine whereby both said exhaust gas and said drive train are able to transmit energy to said piston to thereby compress air in said air charging chamber which is transmitted to said cylinder and whereby when said exhaust gas energy exceeds the magnitude needed to compress said air in said air charging chamber, a portion of said exhaust gas energy is transmitted by said engine through said piston and said drive train, and means for changing said phase relationship between said piston and said engine crankshaft.

2. The combination supercharger and exhaust driven motor according to claim 1 wherein said means for changing phase comprises a belt drive coupled to a pair of separated gears, and a pair of movable pulleys acting on said belt between said gears to change the length of said belt between said gears.

3. The combination supercharger and exhaust driven motor according to claim 1 further comprising a buffer within said first conduit means.

4. The combination supercharger and exhaust driven motor according to claim 3 further comprising a pulse operated valve within said first conduit means for delivering exhaust impulses to said supercharger.

* * * * *